United States Patent [19]

Hayamizu

[11] Patent Number: 4,916,468
[45] Date of Patent: * Apr. 10, 1990

[54] MOVABLE INK JET THERMAL PRINTING HEAD TO PREVENT INK STOPPAGE

[75] Inventor: Mamoru Hayamizu, Chiba, Japan

[73] Assignees: Kabushiki Kaisha Toshiba, Kawasaki; Soartec Corporation, Tokyo, both of Japan

[*] Notice: The portion of the term of this patent subsequent to Feb. 7, 2006 has been disclaimed.

[21] Appl. No.: 211,297

[22] Filed: Jun. 24, 1988

Related U.S. Application Data

[63] Continuation-in-part of Ser. No. 451,159, Feb. 23, 1988, Pat. No. 4,803,499.

[30] Foreign Application Priority Data

Mar. 4, 1987 [JP] Japan .................. 62-47456

[51] Int. Cl.$^4$ .................. G01D 15/16; B41J 3/04
[52] U.S. Cl. .................. 346/140 R
[58] Field of Search .................. 346/140

[56] References Cited

U.S. PATENT DOCUMENTS

| | | | |
|---|---|---|---|
| 1,967,900 | 7/1934 | Perry | 346/49 |
| 4,314,259 | 2/1982 | Cairns | 346/75 |
| 4,490,728 | 12/1984 | Vaught | 346/140 X |
| 4,723,136 | 2/1988 | Suzumura | 346/140 |
| 4,803,499 | 2/1989 | Hayamizu | 346/140 |

Primary Examiner—Joseph W. Hartary
Attorney, Agent, or Firm—Cislo & Thomas

[57] ABSTRACT

This invention relates to an ink jet printing head comprising in combination a thermal head having a plurality of thermal dot elements, a guide member having a plurality of grooves corresponding to the thermal dot elements respectively and being in contact with the thermal head, and an ink supplying passageway for supplying ink to the grooves. The rear ends of the grooves are closed and the thermal head and guide member are movable with respect to each other. All of the ink in each of the grooves is respectively and completely jetted out of the grooves together with steam caused by the thermal dot elements producing heat. Ink bubbles do not remain in the grooves, thereby avoiding an overheating condition of the thermal head in an ink-less condition thereby eliminating blockage.

10 Claims, 6 Drawing Sheets

MOVABLE INK JET THERMAL PRINTING HEAD TO PREVENT INK STOPPAGE

The present application is a continuation in-part of an earlier filed Application No. 07/159,541 filed on Feb. 23, 1988, now U.S. Pat. No. 4,803,499, which is based on a Japanese Patent Application No. 62-47456 filed on Mar. 4, 1987 in Japan.

BACKGROUND OF THE INVENTION

This invention relates to an ink jet printing head, particularly one which eliminates ink stoppages during a printing operation. Many kinds of printing machines have been developed from impact types to non-impact types. Non-impact types include electronic photographic systems, electro-static systems, thermal systems and ink jet systems. The ink jet system is very quiet, low in power consumption and small in size, yet broad use of the ink jet system has not been attained. The main reason is that the ink jet system fails frequently due to a blockage condition within the ink jet nozzle. Therefore, substantial efforts have been made to develop an ink jet nozzle to avoid this problem. Such efforts have not been sufficient to use ink jet systems without the problems mentioned above, whereby sufficient reliability is obtained.

Furthermore, a new type of ink jet printer using a film having a plurality of holes or recesses in which ink is supplied is disclosed in U.S. Pat. No. 4,608,577 issued Aug. 26, 1986. Yet, it is still very difficult to completely print using a plurality of holes within the film since the film floats upon a bubble while ink is sprayed using instantaneous heat of a thermal head. Printing of sufficient density cannot be obtained.

Some of the prior art which addresses this problem is disclosed in U.S. Pat. Nos. 3,747,120, 4,263,601, 4,308,547, 4,312,009, 4,337,467, 4,366,487 and 4,515,487.

Furthermore, Japanese Patent Publication 61-59914 shows an open ended ink jet nozzle. Only a part of the ink in the nozzle is sprayed by a process causing bubbles. Increasing and decreasing the amount of ink bubbles allows printing. When the ink is quickly heated in the nozzle, some bubbles remain. However, if the thermal dot element is heated without ink, the printing head is damaged.

SUMMARY OF THE INVENTION

It is an object of the present invention to provide a highly effective means for eliminating the above-described disadvantages. For achieving this object, the present invention provides an ink jet printer comprising a thermal head having a plurality of thermal dot elements, and a guide member having a plurality of grooves which are in contact with the thermal head. The plurality of grooves correspond in number to the thermal dot elements. An ink supplying means supplies ink to the grooves. The rear ends of each of the grooves are closed. The thermal head and guide member are relatively movably to each other. This invention relates to an improvement of pending U.S. patent application No. 87/15902 now Pat. No. 4,803,499 by this Applicant.

DESCRIPTION OF THE PREFERRED EMBODIMENTS

Figure 1:
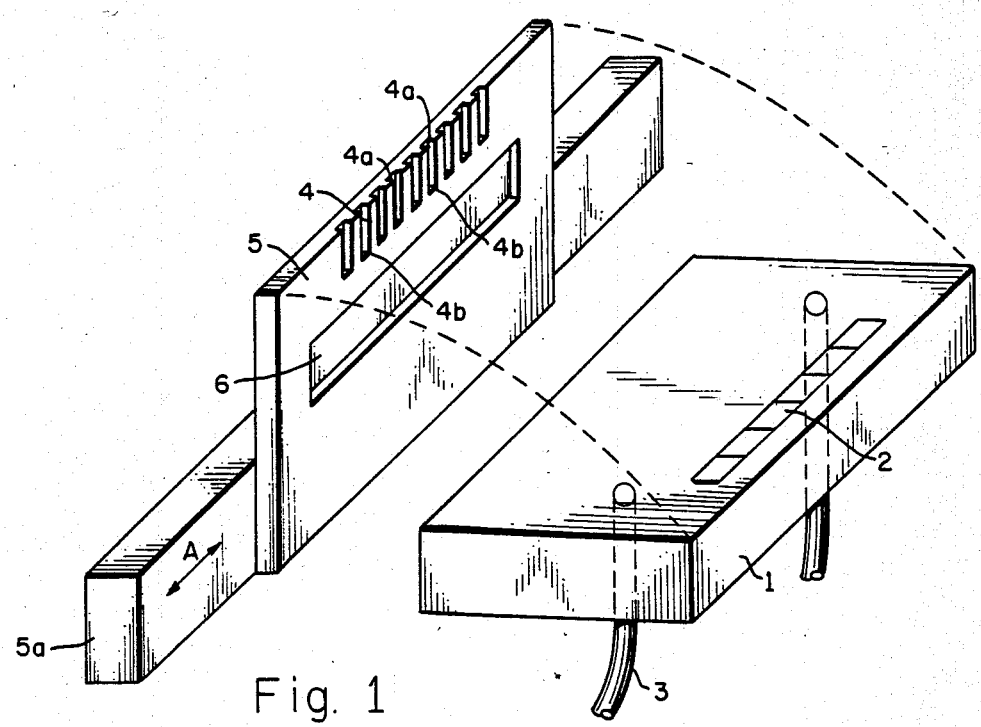
FIG. 1 shows a perspective view of a disassembled condition of one embodiment of the present invention.

Reference is now made to the accompanying drawings showing certain preferred embodiments of the present invention. As shown in FIG. 1, a thermal head 1 has a plurality of thermal dot elements 2, and an ink supplying pipe 3 (shown partially in phantom) which is connected to an outer ink tank (not shown). The pipe 3 is mounted on the thermal head 1. Another pipe 3a (shown partially in phantom) may also be used. A guide member 5 having a plurality of grooves 4, form a plurality of ink nozzles, and is slidably mounted onto a bar 5a which moves along a path marked by A. The bar 5a and the guide member 5 are positioned along a point marked by the arrow B shown in FIG. 2. The number of grooves 4 do not necessarily correspond to a the number of thermal dot elements 2.

Each of the grooves 4 need not completely correspond directly to each of the thermal dot elements 2 by a 1:1 correspondence. A space between each of the grooves 4 may be 0.03 mm as an example. The width of each of the thermal dot elements 2 may be 0.08 mm for this example, whereby the plurality of grooves 4 correspond to the plurality of thermal dot elements 2 by a 3:1 ratio.

Figure 2:
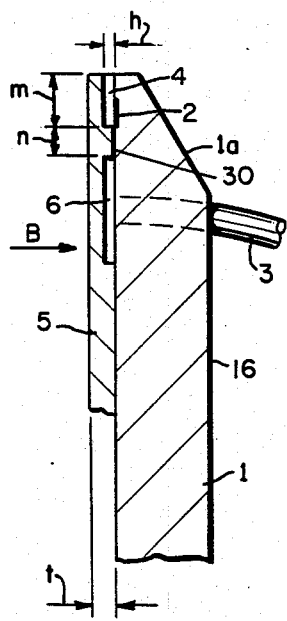
FIG. 2 shows a side cross-sectional view of the embodiment shown in FIG. 1 of the present invention.

Each of the grooves 4 are particularly unique in the present invention. The front end 4a of each groove is open and a rear end 4b is closed. An ink gathering portion 6 is formed within guide member 5 and communicates with the grooves 4 by a very small passageway 30 shown in phantom in FIGS. 1 and 7. By way of example, measurements and location of the grooves 4, passageway 30, and ink gathering portion 6 for one example are shown in FIG. 2 where: h is 0.005–0.1 mm, m is 0.02–0.2 mm, n is 0.01–0.5 mm and t is 0.04–0.2 mm. Furthermore, a driving frequency for reciprocally moving the guide member 5 as shown in the directions indicated by the arrow marked A is about 0.1–5 KHZ.

Figure 3:
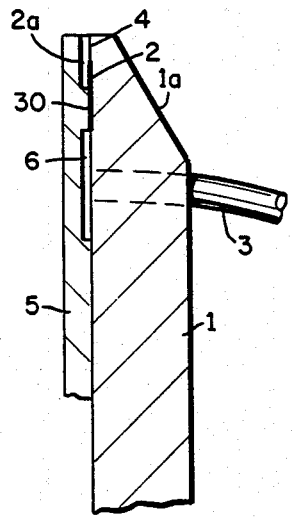

The thermal dot elements 2 are positioned adjacently aligned with the grooves 4 as shown in FIG. 2. However, in another embodiment of the present invention as shown in FIG. 3, a lower 2a of each of the plurality of the thermal dot elements 2 extends beyond each of the terminii of grooves 4.

The thermal dot elements 2 experience vibration during reciprocal movement of the guide member 5. The guide member 5 also releases a great amount of fluid pressure when ink is jetted therefrom, causing a pumping action from the ink gathering portion 6 to the grooves 4. This action creates an ink lather, whereby an effective pumping operation is maintained.

Figure 4:
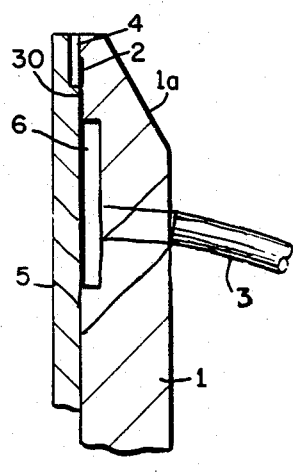
FIGS. 3, 4 and 5 show side cross-sectional views of other embodiments of the present invention.

FIG. 4 shows another embodiment of the present invention in which the ink gathering portion 6 is formed within the thermal head 1. The embodiment shown in FIG. 4 has a similar operation for those like enumerated elements as those embodiments described and shown in FIGS. 1-3.

Figure 5:
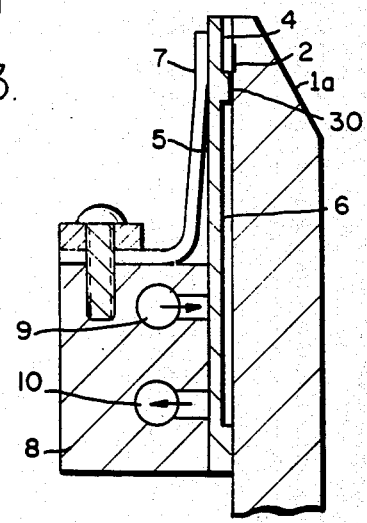

FIG. 5 shows another embodiment of the present invention. The embodiment comprises thermal head 1, the guide member 5 which is held in position by a plate spring 7 secured as shown. Ink circulation pipes 9 and 10 are formed within a bracket member 8. The plate spring 7, and the ink circulation pipes 9 and 10 communicate with the ink gathering portion 6. This configuration allows the continuous supply of ink to the ink gathering portion 6 by circulating ink in the direction of the arrows shown in FIG. 5.

Figure 6:
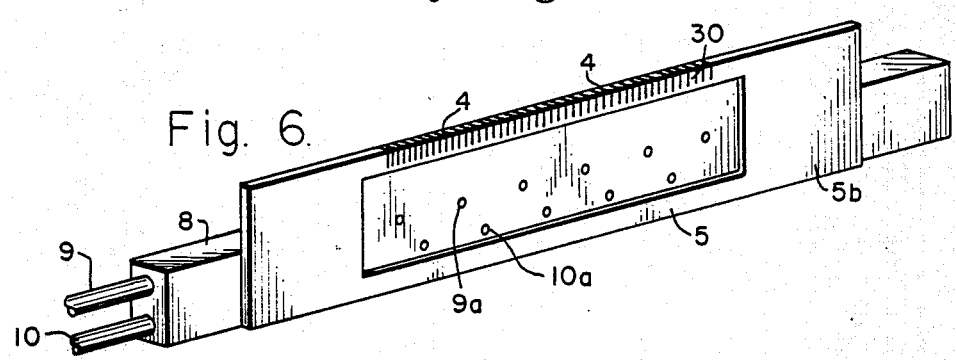
FIG. 6 shows a top right perspective view of several components of the embodiment of the present invention shown in FIG. 5.

FIG. 6 shows a back face 5b of the guide member 5 of the embodiment shown in FIG. 5. The communication points of the ink circulting pipes 9 and 10 to the ink gathering portion 6 are represented by the reference numerals 9a and 10a, respectively.

Figure 7:
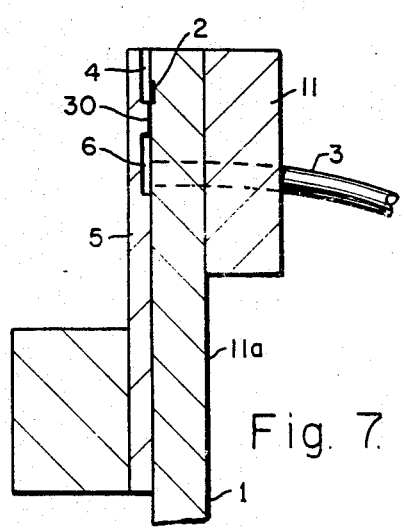
FIG. 7 shows a side cross-sectional view of another embodiment of the present invention.

FIG. 7 shows another embodiment of the present invention. A magnet 11 is attached to the back face 11a of said thermal head 1. The guide member 5 is composed of metal which is magnetically in contact with the thermal head 1.

Figure 8:
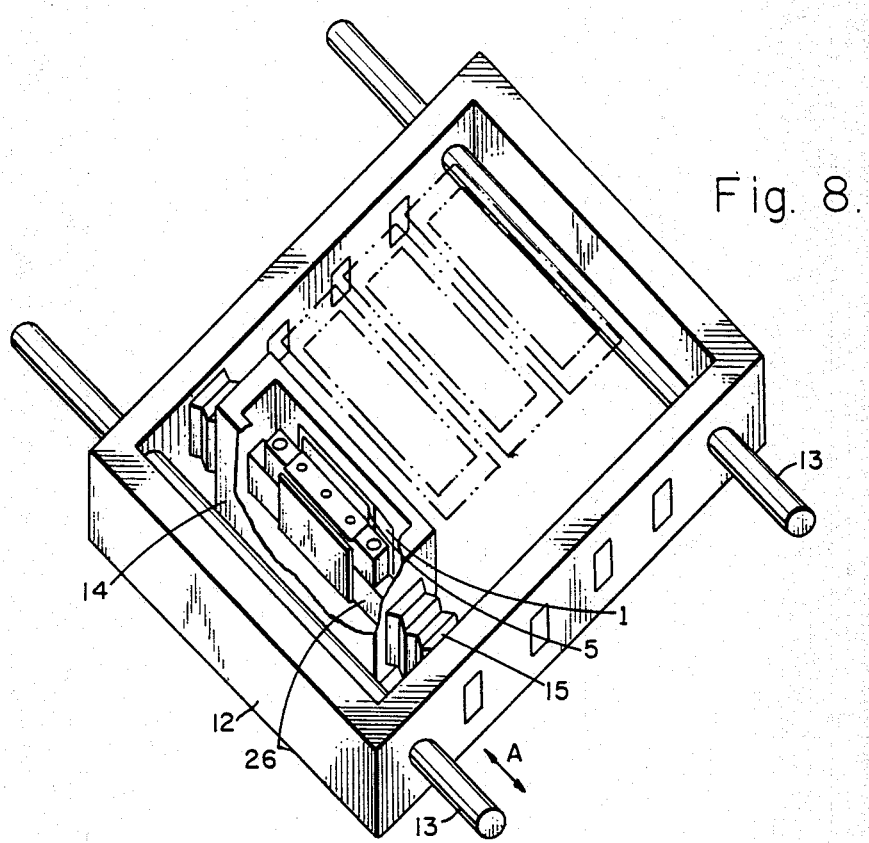
FIG. 8 shows a top left perspective view of a frame and cage partially cutaway showing an embodiment of the present invention.

FIG. 8 shows another embodiment of the present invention for reciprocally moving the guide member 5. A frame 12 is reciprocally driven by guide axes 13 in the direction indicated by the arrow marked A using a reciprocal driving means (not shown). Together with the thermal head 1, the guide member 5 is affixed to a rectangular axis 26 which is affixed to a cage 14 held by the frame 12. The cage 14 is shown partially cutaway in FIG. 8 for purposes of illustration. Furthermore, a rubber seal 15 is mounted between the frame 12 and the cage 14 to seal the ink within the rectangular axis 26 during reciprocal movement.

Therefore, the guide member 5 is reciprocally slidable along the directions of the arrow marked A against the thermal head 1 which is held in a complementary and stationary position by reciprocally driving the frame 12 along the guide axes 13 in the direction marked by the arrow A.

Figure 9:
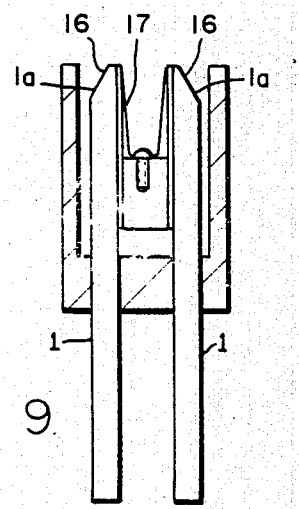
FIG. 9 shows a side elevational view of another embodiment of the present invention in partial cross-section.
Figure 10:
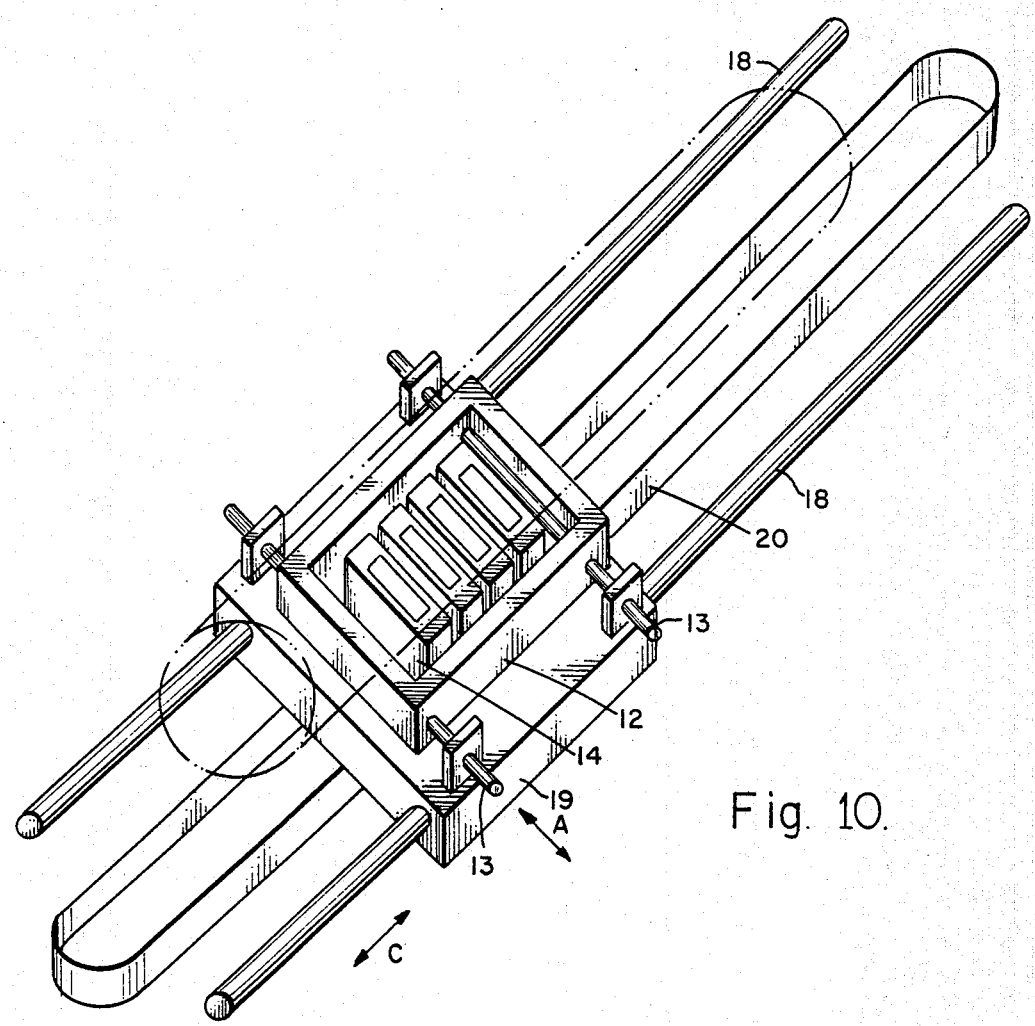
FIG. 10 is top right perspective view of an embodiment of the present invention mounted on a frame.

FIGS. 9 and 10 show another embodiment of the present invention. The embodiment functions as a serial color printer using the thermal head 1 of FIG. 8. A reciprocal moving frame 12 is mounted on a pair of guide axes 18. The frame 12 moves in the direction indicated by the arrow marked C. The frame 12 is also mounted on a second reciprocal moving frame 19. The second frame 19 is driven by a timing belt 20. The moving frame 12 moves along the direction of the arrow marked A upon the second moving frame 19.

Figure 11:
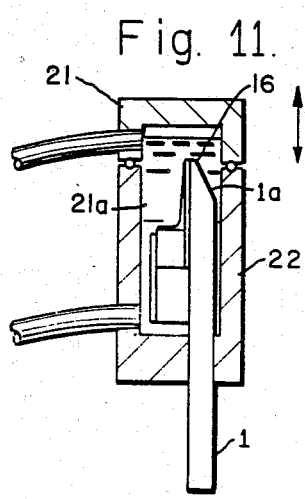
FIGS. 11 and 12 show cross-sectional views of two other embodiments of the present invention.

FIG. 11 shows another embodiment of the present invention. A heating device 16 is positioned within a block 22 having an internal cavity 22a and a cover 21 for protecting the grooves 4 from drying out. The heating device 16 is submerged in ink 21a within the block 22 and the cover 21 is closed when not printing. Furthermore, the ink 21a and cover 21 are removed from the block 22 during printing operations. Elimination of the ink 21a proves very effective due to a chamfered face 1a of thermal head 1.

Figure 12:
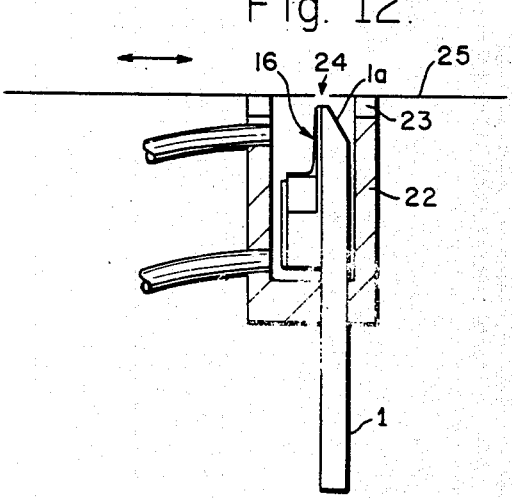

FIG. 12 shows another embodiment of the present invention. A face 23 of the block 22 is opened and closed by a shutter 25 creating an opening 24 in an open position. In a closed position the ink within the plurality of grooves 4 is protected from drying up.

The operation of the present invention will now be discussed. In FIG. 2, ink is supplied to the ink gathering portion 6 and the guide member 5 is reciprocally moved along the directions shown by the arrow marked A. Then, the ink is continuously supplied to the plurality of grooves 4 through the very small passageway 30 between the guide member 5 and the thermal head 1.

In this condition, when a certain driving pulse is applied to the plurality of thermal dot elements 2 from a control circuit (not shown), all of ink in the grooves 4 is jetted or sprayed onto a printing surface (not shown) together with steam. Ink is supplied to the grooves 4 effectively by suction yielding a pumping action caused by the jetting operation when the ink is heated and sprayed out of the thermal head 1, by the sliding operation of the guide member 5, and by the pumping effect due to the vibration of the guide member 5.

Therefore, all of the ink in the plurality of grooves 4, since their rear ends are closed, completely jets onto the printing surface together with steam. This results in a unique frying phenomenon of ink bonding to the printing surface. The device is able to control the jet of ink from the plurality of grooves 4 by applying heat energy above a certain operating level known in the art.

According to the present invention, all of the ink in each of the grooves 4 is completely jetted out of the grooves together with steam caused by heat for each electronic pulse sent to a selected plurality of thermal dot elements 2. This is primarily because one end of each of the groove 4 is closed. Bubbles of ink do not remain in each of the grooves 4, whereby an ink clogging condition within the thermal head 1 can occur. Therefore the invention allows a stable printing condition.

A stoppage of ink in the plurality of grooves 4 is eliminated by a self-cleaning effect caused by the respective movement between the guide member 5 and the thermal head 1.

A simple change in the guide member 5 when an ink stoppage condition occurs (which is rare) remedies any possible problem.

Ink is speedily and effectively supplied to the plurality of grooves 4 by suction due to the jetting of ink, the pumping operation due to the sliding operation of the guide member 5, and the pumping operation due to the vibration of the guide member 5.

Printing in accordance with the present invention concept system may be provided without sensitive pulse control of the energy supplied to the thermal dot elements, when such energy is above a predetermined level, as all of the ink in each of the grooves is completely jetted from each of the grooves since the grooves have closed rear ends.

The invention is further able to precisely print using a very small groove of about 0.01 mm since the jetting power is so great.

What is claimed is:

1. An ink jet printing head comprising:
(a) a thermal head having a plurality of thermal dot elements for creating heat; (b) a guide member slideably mounted for reciprocal movement on said thermal head so as to be in operative engagement with said thermal dot elements, said guide member having a plurality of grooves in proximity to said thermal dot elements, said plurality of grooves being of greater number than said plurality of thermal dot elements, each of said grooves having an open first end and a substantially closed second end defining a substantially closed chamber open at one end for expelling ink therefrom, said reciprocal movement being in a direction substantially perpendicular to said grooves, whereby said reciprocal movement of said guide member relative to said thermal head substantially prevents said grooves from becoming blocked and for maintaining a flow of said ink during operation, wherein said guide member and said thermal head when in overlapping relationship form a passageway therebetween to carry ink from an ink gathering recess to each of said substantially closed second ends of each grooves for delivery to said thermal dot elements, wherein the ink within each of said grooves can be heated and caused to bubble and spray substantially all of the ink out of said grooves and thereby aid in substantially preventing said grooves from becoming blocked; and, (c) an ink supplying means for supplying said ink gathering recess with ink.

2. An ink jet printing head as claimed in claim 1, wherein said ink gathering recess is formed within said guide member.

3. An ink jet printing head as claimed in claim 1, wherein said ink gathering recess is formed within said thermal head.

4. An ink jet printing head as claimed in claim 1, wherein said thermal dot elements are positioned adjacent said grooves, respectively.

5. An ink jet printing head as claimed in claim 1, wherein said thermal dot elements extend a distance beyond said grooves, respectively.

6. An ink jet printing head as claimed in claim 1, wherein said guide member comprising a resilient material and normally in contact with said thermal head.

7. An ink jet printing head as claimed in claim 1, wherein said guide member comprising a resilient metal material in magnetic contact with said thermal head, wherein said thermal head comprising a back face and a magnet wherein said magnet is attached to said back face.

8. An ink jet printing head as claimed in claim 1, wherein said ink gathering portion is sized to receive said guide member and said thermal head and wherein said guide member and said thermal head are submergible within said ink gathering portion.

9. An ink jet thermal printing head for spraying ink onto a printing surface comprising:
(a) a thermal head having a plurality of thermal dot elements for creating heat, said thermal head having a recessed portion defining an ink gathering portion;
(b) a guide member slideably mounted for reciprocal movement on said thermal head so as to be in operative engagement with said thermal dot elements, said guide member having a plurality of grooves in proximity to said thermal dot elements, said plurality of grooves being of greater number than said plurality of thermal dot elements, each of said grooves having an open first end and a substantially closed second end defining a substantially closed chamber open at one end for expelling ink therefrom, said reciprocal movement being in a direction substantially perpendicular to said grooves, whereby said reciprocal movement of said guide member relative to said thermal head substantially prevents said grooves from becoming blocked and for maintaining a flow of said ink during operation, wherein said guide member and sais thermal head when in overlapping relationship form a passageway therebetween to carry ink from said ink gathering portion of said thermal head to each of said substantially closed second ends of said grooves for delivery to said thermal dot elements, wherein the ink within each of said grooves can be heated and caused to bubble and sprary substantially all of the ink out of said grooves and onto the printing surface, thereby aiding in substantially preventing said grooves from becoming blocked; and
(c) an ink supplying means fluidedly coupled to said ink gathering portion of said thermal head for supplying ink thereto.

10. An ink jet thermal printing head for spraying ink onto a printing surface comprising:
(a) a thermal head having a plurality of thermal dot elements for creating heat;
(b) a guide member having a recessed portion defining an ink gathering portion and slideably mounted for reciprocal movement on said thermal head so as to be in operative engagement with said thermal dot elements, said guide member having a plurality of grooves in proximity to said thermal dot elements, said plurality of grooves being of greater number than said plurality of thermal dot elements, each of said grooves having an open first end and a substantially closed second end defining a substantially closec chamber open at one end for expelling ink therefrom, said reciprocal movement being in a direction substantially perpendicular to said grooves, whereby said reciprocal movement of said guide member relative to said thermal head substantially prevents said grooves from becoming blocked and for maintaining a flow of said ink during operation, wherein said guide member and said thermal head when in overlapping relation form a passageway therebetween to carry ink from said ink gathering portion of said thermal head to each of said substantially closed second ends of said grooves for delivery to said thermal dot elements, wherein the ink within each of said grooves can be heated and caused to bubble and spray substantially all of the ink out of said grooves and onto the printing surface, thereby aiding in substantially preventing said grooves from becoming blocked; and
(c) an ink supplying means fluidedly coupled to said ink gathering portion of said guide member for supplying ink thereto.

* * * * *